(No Model)

R. K. GREGORY.
NUT LOCK.

No. 583,369. Patented May 25, 1897.

Witnesses
Wm F. Doyle

Inventor
Richard K. Gregory.
By H. B. Willson,
Attorney

UNITED STATES PATENT OFFICE.

RICHARD KIDDER GREGORY, OF GREENSBOROUGH, NORTH CAROLINA.

NUT-LOCK.

SPECIFICATION forming part of Letters Patent No. 583,369, dated May 25, 1897.

Application filed November 19, 1896. Serial No. 612,744. (No model.)

*To all whom it may concern:*

Be it known that I, RICHARD KIDDER GREGORY, a citizen of the United States, residing at Greensborough, in the county of Guilford and State of North Carolina, have invented certain new and useful Improvements in Nut-Locks; and I do declare the following to be a full, clear, and exact description of the invention, such as will enable others skilled in the art to which it appertains to make and use the same.

My invention has relation to certain new and useful improvements in the construction of nut-locks; and the object is to provide a simple, durable, and reliable device of this kind.

To this end the novelty consists in the construction, combination, and arrangement of the same, as will be hereinafter more fully described, and particularly pointed out in the claim.

In the accompanying drawings the same reference-numerals indicate the same parts of the invention.

Figure 1:
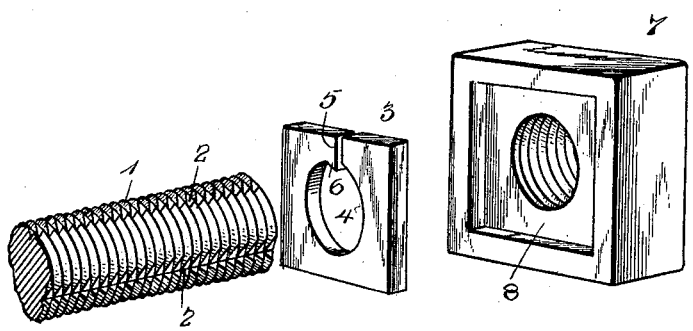
Figure 2:
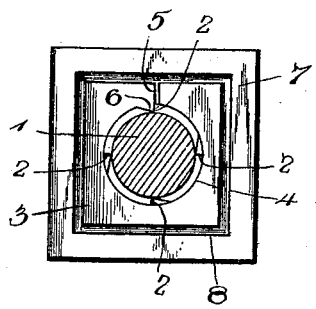

Figure 1 is a perspective view of the threaded end of a bolt with the washer and nut separated and embodying my invention; and Fig. 2 is a transverse vertical section of the bolt, looking toward the nut.

1 represents the threaded end of the bolt, provided with a series of longitudinal ratchet-shaped grooves 2 2.

3 represents a rectangular spring-steel washer provided with a central circular orifice 4 of approximately the size of the outside diameter of the threaded end of the bolt 1. This washer is formed with a radial slot 5, one of the contiguous edges of which is formed with an integral inwardly-projecting ratchet-shaped tooth 6.

7 represents the threaded nut, the inner face of which is formed with a rectangular recess 8, which is slightly larger than the washer and which fits loosely in it, and as the nut is turned to the right in the act of screwing it home it carries the washer 3 with it, the ratchet-shaped tooth riding freely over the threads and the grooves in the bolt; but on an attempt being made to reverse the nut or turn it backward to the left the tooth 6 is forced by the spring action of the washer into one of the grooves in the bolt, which locks both the washer and the nut rigidly to the bolt.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A nut-lock comprising the bolt 1, the threaded end of which is provided with a series of longitudinal ratchet-shaped grooves 2, the rectangular washer 3, having a central circular orifice 4, radial slot 5, and projecting ratchet-shaped tooth 6, formed integral with one of the edges of the washer which form the slot 5, and the nut 7 having its inner face provided with a rectangular recess 8, adapted to contain said washer 3, substantially as shown and described.

In testimony whereof I hereunto affix my signature in presence of two witnesses.

RICHARD KIDDER GREGORY.

Witnesses:
ROBT. GILMAN GLENN,
JOHN B. GUNTER.